April 2, 1940. G. A. H. NUYTS 2,195,935
STERILIZING DEVICE
Filed Jan. 31, 1939
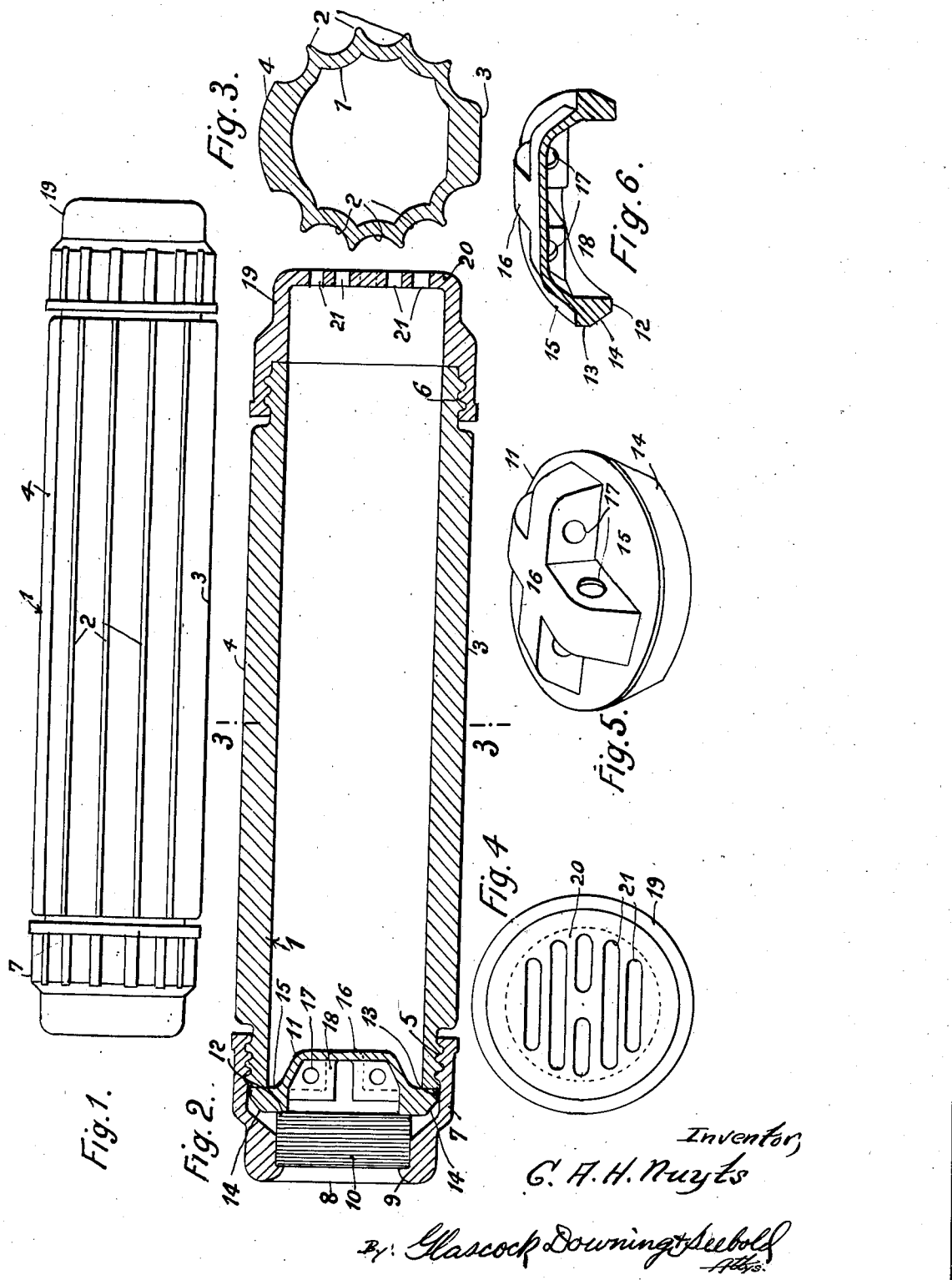

Patented Apr. 2, 1940

2,195,935

UNITED STATES PATENT OFFICE 2,195,935

STERILIZING DEVICE

Georges Alfred Hippolyte Nuyts, Le Vesinet, France, assignor to Société Anonyme Dentclair, Nanterre (Seine), France Application January 31, 1939, Serial No. 253,844
In France December 29, 1938

1 Claim. (Cl. 206—15.1)

The invention relates to a device for sterilizing tooth-brushes and like articles, which comprises a container in which are lodged the tooth-brush or tooth-brushes to be sterilized, and at the base of which is placed the capsule or the like containing a substance of which the vapours effect or contribute to the sterilization.

The invention has for its object an improved device of this type, which is characterized by the fact that the capsule or the like, which contains the substance of a sterilizing nature, is surmounted by a member, or cap, which protects said capsule from the drops liable to fall from the brush, while allowing the sterilizing vapours to be evolved.

This protecting member is preferably simply formed by a disc provided with reliefs on the face which is turned towards the brush, the perforations of said disc opening into said reliefs, at a considerable height above the disc.

Preferably also, the end of the container on which the capsule rests is provided with a large central orifice.

The improved device according to the invention enables the substance contained in the capsule to be preserved in spite of the drops which may run off the brush after use of same. In fact, such drops fall on the protecting member; they cannot penetrate into the perforations which have a high opening and which are reserved for the sterilizing vapours to pass through, and finally the liquid escapes inside, by travelling round the capsule at some distance from same.

The drawback which was hitherto offered by this type of apparatus and which consists, in the case—which is very frequent in practice—of a badly drained brush, in water reaching the sterilizing substance, is therefore eliminated; as, most frequently, said substance mainly comprises trioxymethylene which is hygroscopic, it sets, on contact with water, in a hard block which, in addition to the fact that it no longer evolves sterilizing vapours, is very difficult to eliminate.

On the other hand, the central orifice in the end on which the capsule rests prevents the user from replacing said capsule by pellets or tablets which he considers to be suitable for effecting the sterilization and which are in reality inefficacious.

Hereinafter, an embodiment of the improved device according to the invention will be described by way of example. Reference will be had to the accompanying drawing in which:

Fig. 1 is an elevational view;

Fig. 2 is a longitudinal sectional view;

Fig. 3 is a view in transverse section along the line 3—3 of Fig. 2;

Fig. 4 is a top plan view;

Fig. 5 is a perspective view, on a larger scale, of the protecting cap;

Fig. 6 shows, in perspective, an axial section of said cap.

The sterilizing device comprises a tube 1 which is preferably made of a glass exempt from lead compounds. Said tube is provided with longitudinal grooves 2, a flat portion 3, and a bulged face 4 for ensuring an efficient diffusion of the light inside the tube, the ultra-violet rays which pass through the tube co-operating in the sterilization of the object contained therein. Said tube is provided at its ends with two threads, respectively a lower thread 5 and an upper thread 6.

On said lower thread 5 is mounted an end 7 which is made for example of moulded material and which is provided, on its lower wall, with a large central orifice 8, while forming a flange 9. The capsule 10, which contains the substance of a sterilizing nature, rests on said flange 9. Said capsule is surmounted by a protecting cap 11; the latter is provided with an annular flange 12 by means of which it rests on the capsule 10 and which is connected to the vertical face 13 by a fillet 14. On the upper face 15 of the cap is formed a relief 16, the general shape of which is like a four-arm cross. On the substantially vertical faces of each of the arms of said cross, is provided a perforation 17 which is located at a considerable distance from the upper face 15 and which opens into a conjugated cavity 18 of the cross and directly opposite the capsule 10.

The plug 19, which is fitted on the thread 6, is preferably likewise made of moulded material and its upper face 20 is provided with openings 21 of elongated shape.

The sterilizing vapours which are evolved by the capsule 10 pass through the cap 11 by means of the perforations 17 and surround the toothbrush or like article contained in the device. If drops run off the tooth-brush, they fall on to the protecting cap 11 which conveys them outwards, round the capsule 10, without their being able to reach the openings of said capsule through which the sterilizing vapours are evolved. In particular, no liquid can directly reach said openings, owing to the considerable distance between the perforations 17 and the upper face 15 of the cap on which the drops fall.

Furthermore, it will be observed that pellets or tablets of smaller size than the capsule 10 cannot be held by the end 7, owing to the large central orifice 8 provided in same. In addition, said large orifice enables the bottom of the capsule to be readily seen, and under these conditions it is advantageously possible to mark thereon the date on which it should be replaced.

I claim:

A sterilizing device comprising a container, a housing at the base of said container, in said housing a product evolving sterilizing vapours, above said housing a support for the article to be sterilized, said support comprising a disc, a relief formed on the face of said disc which is turned towards the inside of said container, lateral faces on said relief, said faces having orifices therein which open into said housing.

GEORGES ALFRED HIPPOLYTE NUYTS.